Patented June 16, 1942

2,286,380

UNITED STATES PATENT OFFICE 2,286,380

ALKYL NAPHTHYLMETHYL CYANAMIDES

Richard O. Roblin, Jr., Old Greenwich, Conn., assignor to American Cyanamid Company, New York, N. Y., a corporation of Maine No Drawing. Application October 5, 1940, Serial No. 359,900

4 Claims. (Cl. 260—551)

This invention relates to new disubstituted cyanamide compounds of the formula:

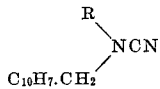

wherein R is an aliphatic hydrocarbon radical.

These compounds may be generally prepared in an inert solvent such as benzene or petroleum ether fractions by the reaction between the corresponding secondary amine, cyanogen chloride and caustic soda. A preferred equation for this reaction is as follows:

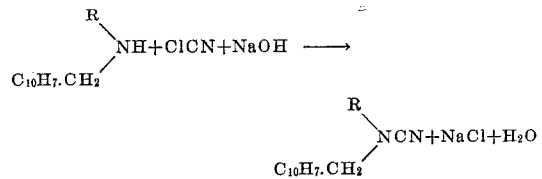

Example 1

6.1 grams of cyanogen chloride are dissolved in 100 cc. of benzene. After cooling the solution to 0°–5° C., 17.1 grams of methyl-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as methyl-1-naphthylmethyl cyanamide.

Example 2

6.1 grams of cyanogen chloride are dissolved in 100 cc. of benzene. After cooling the solution to 0°–5° C., 19.7 grams of allyl-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as allyl-1-naphthylmethyl cyanamide.

Example 3

6.1 grams of cyanogen chloride are dissolved in 100 cc. of benzene. After cooling the solution to 0°–5° C., 22.7 grams of isoamyl-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The benzene is removed by distillation under reduced pressure. The residue is vacuum distilled and the product identified as isoamyl-1-naphthylmethyl cyanamide.

Example 4

6.1 grams of cyanogen chloride are dissolved in 150 cc. of heptane. After cooling the solution to 0°–5° C., 26.9 grams of n-octyl-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as n-octyl-1-naphthylmethyl cyanamide.

Example 5

6.1 grams of cyanogen chloride are dissolved in 200 cc. of heptane. After cooling the solution to 0°–5° C., 32.5 grams of n-dodecyl-1-naphthylmethyl amine are gradually added with stirring. When this addition is completed, the mixture is agitated with a solution of 4 grams of sodium hydroxide dissolved in 20 cc. of water and allowed to stand one hour. The reaction mixture is washed with dilute hydrochloric acid and then with water. The water layer is removed and discarded. The solvent layer is dried with a small amount of anhydrous sodium sulfate. The heptane is removed by distillation under reduced pressure. The residue is vacuum distilled and the product identified as n-dodecyl-1-naphthylmethyl cyanamide.

Similarly other disubstituted cyanamides of the above class in both the normal and isomeric forms may be prepared utilizing the corresponding secondary amine.

It is to be understood that the above examples are illustrative only.

These new compounds are adapted for various uses, more particularly as intermediates, insecticides and plasticizers for natural and synthetic resins.

While the invention has been described with particular reference to specific embodiments, it is to be understood that it is not to be limited thereto but is to be construed broadly and restricted solely by the scope of the appended claims.

I claim:

1. As a new compound, a disubstituted cyanamide of the formula:

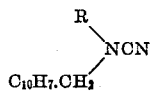

wherein R is an aliphatic hydrocarbon radical.

2. As a new compound, methyl-1-naphthylmethyl cyanamide.

3. As a new compound, isoamyl-1-naphthylmethyl cyanamide.

4. As a new compound, n-octyl-1-naphthylmethyl cyanamide.

RICHARD O. ROBLIN, Jr.